350-392
SR
XR 3,903,358 102SW

United States Patent [19]

Roese

[11] 3,903,358

[45] Sept. 2, 1975

[54] PLZT STEREOSCOPIC TELEVISION SYSTEM

[76] Inventor: John A. Roese, 6315 Camino Corto, San Diego, Calif. 92120

[22] Filed: May 22, 1974

[21] Appl. No.: 472,254

[52] U.S. Cl. ............ 178/6.5; 178/DIG. 1; 350/150; 352/63

[51] Int. Cl. ............................................ H04n 9/54

[58] Field of Search ........ 178/6.5, DIG. 1; 350/150; 352/63

[56] References Cited

UNITED STATES PATENTS

| | | | |
|---|---|---|---|
| 2,433,971 | 1/1948 | Adams | 178/6.8 |
| 3,536,921 | 10/1970 | Caulfield | 250/199 |
| 3,701,121 | 10/1972 | Fraser | 340/173.2 |
| 3,737,567 | 6/1973 | Kratomi | 178/6.5 |
| 3,821,466 | 6/1974 | Roese | 178/6.5 |

OTHER PUBLICATIONS

Stereotronic Corporation "Convert Your Industrial Television to 3D–TV . . . In Minutes" 1961.

*Primary Examiner*—Robert L. Griffin
*Assistant Examiner*—Edward L. Coles
*Attorney, Agent, or Firm*—Richard S. Sciascia; Ervin F. Johnston; William T. Skeer

[57] ABSTRACT

A stereoscopic television system employs alternate left-right image presentations. A stereoscopic viewer driven in synchronism with the picture rate presentation employs PLZT light valves. Left-right presentation of images is made using the interlace pattern retrace such that each television frame includes a left and a right image.

8 Claims, 4 Drawing Figures

3903358

PLZT STEREOSCOPIC TELEVISION SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains generally to the field of electro-optics. More particularly, this invention pertains to the field of television. In greater particularity, this invention pertains to stereoscopic television. By way of further characterization, the invention pertains to stereoscopic television employing time separated image pairs. In still greater particularity, this invention is directed to a stereoscopic television system employing a piezoelectric light valve. By way of further characterization, but without limitation thereto, this invention pertains to a stereoscopic television system employing a lanthanum modified lead zirconate-titanate (PLZT) light valve.

DESCRIPTION OF THE PRIOR ART

The field of stereoscopic television is a relatively new branch of the electro-optical arts. However, despite its relative newness, the prior art includes several known operational systems. There are five basic types of stereoscopic systems which have given varying degrees of success. These various systems are characterized by the type of image separation and viewer mechanism employed to obtain the necessary left eye and right eye images. Briefly, these are: refracting and reflecting the stereoscopes, anaglyphic stereoscopes, polarized filter stereoscopes, electromechanical stereoscopes, and electronically controlled nematic liquid crystal stereoscopes. Although each of these systems have contributed to the advance of the fund of knowledge in this highly important branch of electro-optics, each of the systems have principal drawbacks which limit their general applicability.

For example, the refracting and reflecting stereoscopes, although simple in design, have the disadvantage that the left and the right eye images must be continuously displayed in a side-by-side format which reduces the effective area of the television display by one-half. Also, the refracting stereoscopic glasses require that the head of the viewer be held vertical at all times to ensure a horizontal location of the left and right eye images. A wearer of the viewing devices frequently experiences eye strain and, further, may not look at objects closely adjacent the television monitor with both eyes.

Polarized filters and anaglyphic stereoscopes similarly require vertical positioning of the viewer's head, screen size limitations, and, in the case of the anaglyphic stereoscopes, are not compatible with the color.

The electromechanical shutter devices are satisfactory in image presentation, but require bulky viewers which are difficult to maintain in synchronism. Further, difficulty has been experienced with mechanical failure of the shutter drive systems.

An all-electronic system has been sought for many years and some degree of success has been obtained by using an electronically controlled nematic liquid crystal. However, these liquid crystals have the inherent disadvantage of slow transition time between the two optical transmission states. That is, transition times are typically too slow for satisfactory operation at normal television field rates of 60 fields per second (30 frames per second having two interlaced patterns). A further and more significant disadvantage of the liquid crystal is that the maximum to minimum transmission ratio is not sufficiently high to completely eliminate the field of the object during the opaque portion of the viewing cycle when the transmission is high enough to be used with the rather dim CRT type display. As a result of a slow decay time and the ratio of transmission, a left ghost is seen during the right viewing interval and vice versa.

SUMMARY OF THE INVENTION

The present invention is closely akin to the known electronically controlled liquid crystal television systems. However, instead of employing liquid crystals, the system of the invention uses a ferroelectric lead zirconate-titanate ceramic material. Such materials are well known for their piezoelectric properties in the electro-acoustic arts. However, when this material is modified with lanthanum, it becomes optically transparent and behaves much in the same fashion as the liquid crystal known in the prior art. However, it has been discovered that the switching times and opacity-transmission ratios are several orders of magnitude better than the best obtained results using liquid crystals. The use of these ceramic light valves in a system with interlace image separation has provided a vastly improved system.

STATEMENT OF OBJECTS OF THE INVENTION

It is accordingly an object of this invention to provide a new and improved television system.

A further object of the present invention is to provide a new and improved stereoscopic television system.

Another object of the present invention is to provide a stereoscopic television system having a full screen stereoscopic display.

A still further object of the present invention is to provide an improved stereoscopic television system which permits the viewer to view objects other than the television screen with normal perception.

Another object of the present invention is to provide a stereoscopic television system having a lightweight, stereoscopic viewer permitting viewer mobility.

A still further object of the present invention is to provide a stereoscopic television system having improved left-right image separation.

These and other objects of the invention will become more readily apparent from the ensuing specification when taken together with the appended claims and drawings.

DESCRIPTION OF THE PREFERRED EMBODIMENT

Figure 1:
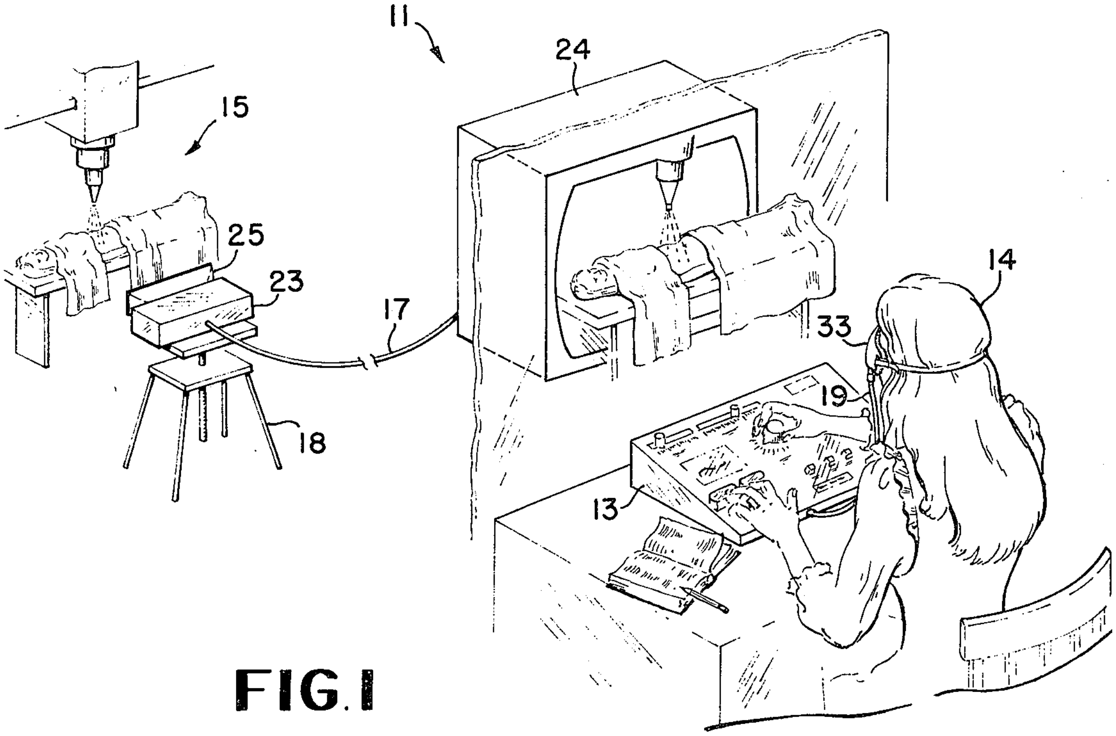
FIG. 1 is a perspective view of the system of the invention as it might be used.

Referring to FIG. 1, the television system of the invention is indicated generally at 11. As shown, a television receiver 24 is positioned in front of a control console 13 by which an operator 14 controls a distant mechanism 15. Of course, the control aspects of the connection between console 13 and 15 are only illustrative of many environments in which the invention may be practiced. However, the advantages of stereoscopic television presently make it particularly advantageous to use in situations where an operator 14 may be exposed to personal safety hazards as, for example, might be occasioned by high intensity X-ray equipment, handling of radioactive materials, or other hazardous operations. A conventional television camera 23 is connected to receiver 24 by a suitable transmission link. In the illustrated arrangement, this connective link is provided by means of an electrical cable 17. Of course, other camera-receiver interconnections are possible including a wireless signal transmission.

Camera 23 is positioned on a suitable support 18 where it may view the scene 15 which operator 14 desires to observe. As illustrated, television camera 24 has a full frame beamsplitter 25 mounted on the objective lens thereof and operator 14 is wearing stereoscopic viewing glasses 33.

Figure 2:
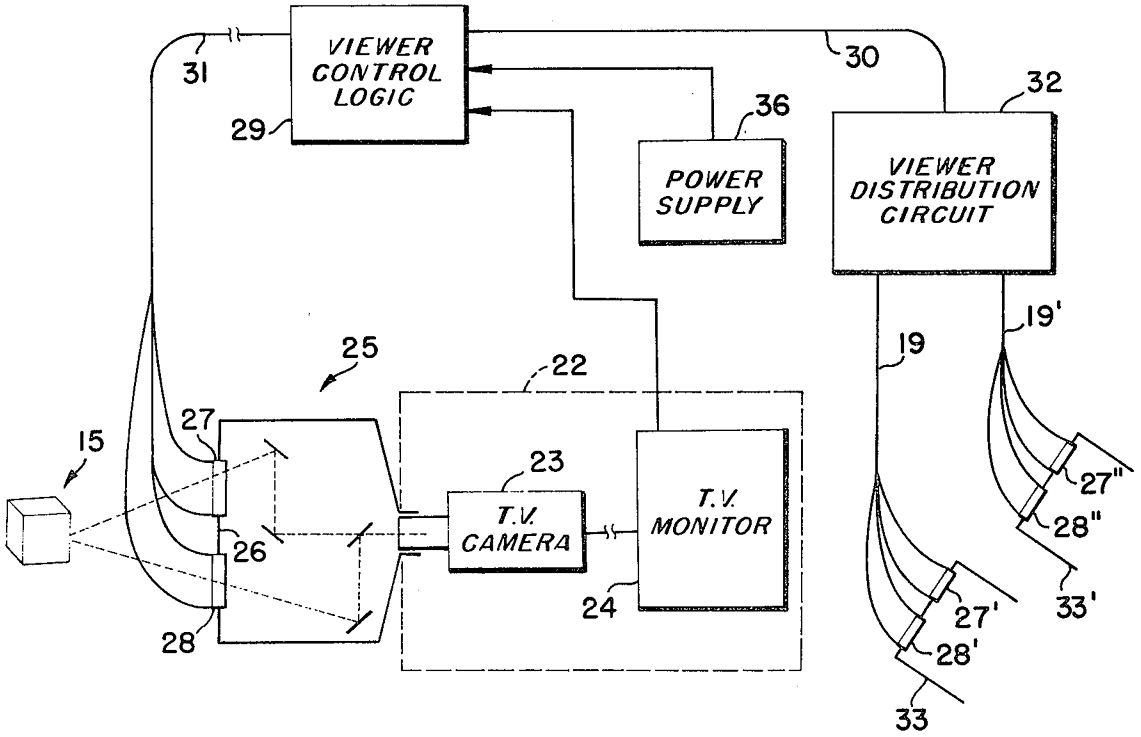
FIG. 2 is a block diagram showing the major components of the system of the invention.

Referring to FIG. 2, a block diagram showing the major components of the stereoscopic television of the invention is illustrated. A conventional camera monitor system is indicated generally at 22 and includes television camera 23 and a television monitor or receiver 24, as previously described in connection with FIG. 1. These units are conventional state-of-the-art apparatuses and may include color systems, if desired. Mounted on the objective lens of camera 16 is a full frame beamsplitter 25.

Beamsplitters such as shown diagrammatically in FIG. 2 are conventional in the stereoscopic camera arts and need not be described further herein. However, it should be noted that all reflectors in the system are front surface optical reflectors except for the reflector closest to the objective lens of camera 23 on the optical axis thereof which is 50—50 beamsplitting front surface reflector. Electronically controlled shutters 27 and 28 are fixedly carried on the front wall 26 of full frame beamsplitter 25.

A viewer control logic circuit 29 derives its operational signals from television receiver 24, and a suitable power supply 36. Power supply 36 provides the operating potential for the various light valves, to be described. In developmental models, the operational potential is 500 volts which is regulated so as to obtain uniform operational results. The operational details of viewer control logic circuit 29 are likewise conventional and are simply alternate-channel switching circuits which are triggered by the interlace field start pulses of the conventional television system. For purposes of completeness, it should be noted that the conventional switching logic described in U.S. Pat. No. 3,373,567 for "Stereoscopic Apparatus Having Liquid Crystal Filter Viewer" issued on June 5, 1973, to Shunsei Kratomi are satisfactory in this operation.

A conductor 31 connects viewer logic control circuit 29 with the light valves on the forward surface of full frame beamsplitter 25. While electrical conductor 30 provides a similar function to a viewer distribution circuit 32 to which a plurality of viewing glasses 33 and 33' may be connected. Viewer distribution circuit 32 is merely an impedance matching circuit such that a plurality of viewers may be used without deleterious effects being transmitted to viewer control logic circuit 29 or other viewers. A simple plural resistance circuit using switching jacks to substitute additional viewers for individual resistances will provide satisfactory results in this application.

Figure 3:
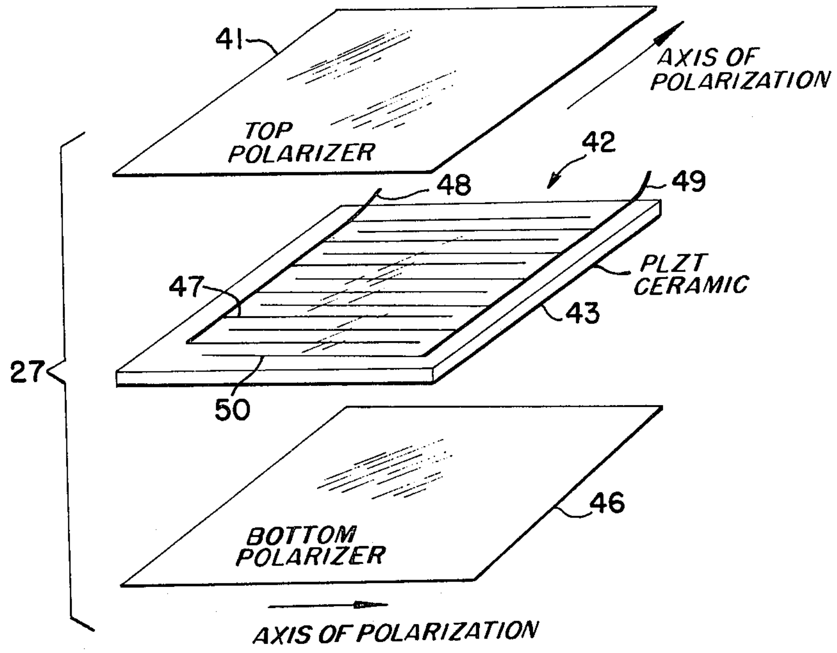
FIG. 3 is an exploded view of one of the light valves used in the stereoscopic viewing device.

Referring to FIG. 3, the details of the individual light valves will be described. Each of the light valves 27, 28, 27', 28', 27'' and 28'' are identical. Therefore, for purposes of simplicity, only light valve 27 will be described in detail.

A top polarizer 41 has its axis of polarization oriented as shown by the arrow. Any satisfactory state-of-the-art sheet polarizing material may be used for polarizer 41. However, polarizers known as Mark's Polarized Formula X–40 have proven satisfactory and have a contrast ratio greater than 1,000. This polarizing material is cemented to a glass plate and the outer surface of the glass plate is quarter wave coated with magnesium fluoride to suppress reflection and the air-glass interface, as is well understood in the optics arts. A plate of lanthanum modified lead zirconate titanate ceramic 43 is ground to the desired thickness. In the operational models of the invention, these discs are of a 9/65/35 composition known as PLZT ceramic material, the various numbers indicating the proportional parts of the constituent elements. These plates are polished to the thickness of one-fourth of a millimeter and have electrodes 47 deposited thereon.

Electrodes 47 and 50 are chrome-gold and are photographically deposited on a single side of PLZT ceramic plate 43 in the illustrated inter-digital patterns. These electrodes are 90 micrometers wide and are plated with an additional conductivity-improving metal. The dimensions and placement make the electrodes essentially transparent to operator 14, although other transparent electrode arrangements known in the electro-optical arts may be used if desired. In operational models this plating was made of a substance known under the trade name Selrex Pur-A-Gold. The individual electrodes are connected to conductors 48 and 49 to provide electrical connections thereto. As noted, other mounting and electrode arrangements may be used to produce the desired control connections if good electro-optical design practice is followed.

In order to minimize surface reflections at the polarizer-PLZT ceramic interface, additional anti-reflective coatings may be used on either side of the PLZT ceramic plate 43. For example, a quarter wave layer of aluminum oxide having a refractive index greater than 1.8 is used to suppress reflections which would be caused by the 2.5 to 1.5 refractive index discontinuity between the PLZT optical elements and the polarizing interface. The final element in the light valve sandwiches, the bottom polarizer 46, has its axis of polarization at right angles to that of polarizer 41 as indicated by the arrow. Polarizer 46 is joined to PLZT ceramic plate 43 in a similar fashion discussed in regard to polarizer 41.

Figure 4:
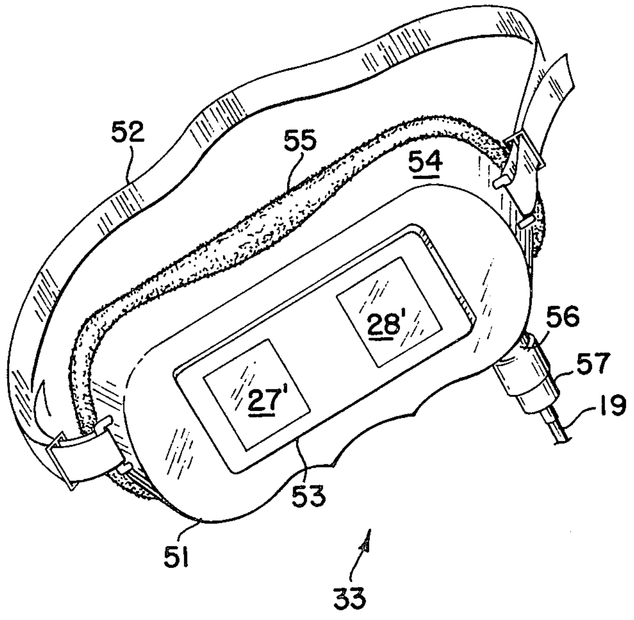
FIG. 4 is a perspective view of the stereoscopic viewer according to the invention.

Referring to FIG. 4, it may be seen that polarizers 27' and 28' are mounted in a suitable carrier 53 which in turn is carried by a front plate 51 of viewer 33. Viewer 33 is held about the head of operator 14 by means of an adjustable headband 52. Side 54 of viewer 53 excludes side and rearwardly impinging light and cuts down on reflections on the rear faces of polarizers 46.

The sides and face portions of viewer 33 are made of a soft, flexible, plastic material. A marginal portion 55 may be turned outwardly in a gentle roll to increase the facial conformity of viewer 33 to the facial contours of the wearer. Electrical connections are made to viewer 33 by means of a cable 19 which terminates in a plug 57 which is received by a suitable socket 56 carried on the lower portion of viewer 33.

Because the PLZT light valves have a very low mass, they may be fitted in conventional spectacle frames, if desired. A lightweight, three or four conductor cable may be connected to the individual light valves across the top of the frame of the spectacles and exit in the vicinity of the temple-frame hinge, if desired.

MODE OF OPERATION

The operation of the device of the invention is as straight-forward and uncomplicated as the operation of any commercial television receiver. That is, operator 14 merely dons the appropriate viewer 33, connects viewer 33 to the viewer distribution circuit 32, and energizes the television system 22. The individual light valves 27′ and 28′ are energized alternately in synchronism with the start-scan control pulses present in the conventional television signal.

The PLZT stereoscopic television system of the invention has a vertical resolution of only one-half of that of the normal resolution due to each eye seeing but a single interlace field. However, since the two fields are effectively merged by the persistency of vision of operator 14, the resulting resolution loss is not as limiting as would appear from purely mathematical considerations. Of course, higher resolution may be obtained by using systems having more raster lines. Such a modification would, of course, compromise the cost of effectiveness of the invention. Also, since each television frame is composed of one-thirtieth of a second frame rate, adequate motion resolution is obtained for normal activities.

The individual light valves are mounted in a viewer 33 to permit superimposition of their viewing apertures with a person of normal eye separation at a distance of approximately 1 meter. The plastic lens holders serve the additional function of providing electrical insulation between the high voltage valves and the wearer in the event of insulation breakdowns. The individual light valves permit rapid switching on the order of 800 microseconds switching time from minimum-to-maximum transmittance and from maximum-to-minimum the transmission time is 300 microseconds. The individual light valves constructed as described are very neutral coloration and therefore may be used with color receivers. Although experimentally made light valves have some slight variations in transmission times and contrast ratios, standardization of construction practices will eliminate such variations.

Because no additional optical elements are used, operator 14 may view other equipment adjacent monitor 24, such as console 13, and other operators with no more inconvenience than would be obtained while wearing sunglasses or other spectacle eye apparel. This important feature for remote control arrangements is not present in other prior art arrangements.

The foregoing description taken together with the appended claims constitutes a disclosure such as to enable a person skilled in the electro-optics arts and having the benefit of the teachings contained therein to make and use the invention. Further, the structure herein described meets the aforestated objects of the invention and generally constitutes a meritorious advance in the art unobvious to such an artisan befret of the benefit of these teachings.

Obviously, many modifications and variations of the present invention are possible in the light of the above teachings, and, it is therefore understood that within the scope of the described inventive concept, the invention may be practiced otherwise than specifically described.

What is claimed is:

1. A television system including:

television camera means having an objective lens for recording a perceptible scene;

full-frame stereoscopic beamsplitter means having spaced entrance apertures and being attached to the objective lens of said television camera for providing stereoscopically related image transmission paths;

light shutter means mounted in operative relation to said full-frame, stereoscopic, beamsplitter means for alternate occultation of the spaced entrance apertures;

television receiver means effectively connected to said television camera means for the display of the stereoscopically related images recorded thereby;

support means configured to conform to the facial contours of a viewer of said television receiver means and having apertures therein positioned to cooperate with the eyes of said viewer for positioning light valves in front of the eyes of the viewer;

a pair of light valve means mounted in the apertures of said support means for selectively interrupting the passage of light therethrough, each light valve including, a first plane polarizer;

a layer of lanthanum modified lead zirconate-titanate, adjacent said first plane polarizer, a first, essentially transparent, electrode on said layer of lanthanum modified lead zirconate-titanate between said layer and said first plane polarizer, a second essentially transparent electrode on said layer of lanthanum modified lead zirconate-titanate in cooperative relationship with said first essentially-transparent electrode, a second plane polarizer having its axis of polarization at right angles to the axis of polarization of said first plane polarizer and adjacent the opposite side of said layer of lanthanum modified lead zirconate-titanate; and electronic drive means connected to the first and second essentially transparent electrodes of each light valve means, to said light shutter means, and connected to said television receiver means for producing alternate actuation of said light shutter means and said pair of light valve means in synchronism with the start of interlace pulses of said television receiver, whereby the viewer of said television receiver may be afforded a true stereoscopic presentation.

2. A television system according to claim 1 in which said light shutter means includes a pair of light interrupters constructed the same as said pair of light valve means.

3. A television system according to claim 1 in which said support means is made of a flexible, dielectric plastic material.

4. A television system according to claim 1 in which the first and second essentially transparent electrodes are a network of thin, spaced, electrical conductors.

5. A television system according to claim 1 in which said electronic drive means actuates the light valve means in synchronism with the interlace traces of said television receiver.

6. A television system according to claim 2 in which said support means is made of a flexible, dielectric plastic material.

7. A television system according to claim 6 in which the first and second essentially transparent electrodes are a network of thin, spaced, electrical conductors.

8. A television system according to claim 7 in which said electronic drive means actuates the light valve means in synchronism with the interlace traces of said television receiver.

* * * * *